United States Patent Office 2,993,918
Patented July 25, 1961

2,993,918
NOVEL COMPOSITIONS OF MATTER AND
METHODS FOR PREPARING THEM
Hans S. Mannheimer, 905 West End Ave., New York, N.Y., assignor to John J. McCabe, Jr., and Hans S. Mannheimer, joint venturers
No Drawing. Original application Apr. 2, 1956, Ser. No. 575,300, now Patent No. 2,781,349, dated Feb. 12, 1957. Divided and this application Dec. 19, 1956, Ser. No. 629,246
3 Claims. (Cl. 260—401)

This invention relates to novel compositions and to methods for producing them. In one of its more specific aspects, the invention is directed to novel derivatives of surface active agents which behave anionically at pH above 7, and which I shall hereinafter refer to as "surface active agents behaving anionically at pH above 7."

Said "surface active agents behaving anionically at pH above 7" have been found useful as detergent, foaming, wetting, emulgating, emulsifying and dispersing agents. They are surface active agents, and serve as excellent synthetic detergents, dye assistants and softeners in the textile and related fields.

Said "surface acting agents behaving anionically at pH above 7," employed as starting materials in the practice of this invention, are of the following general Formula I

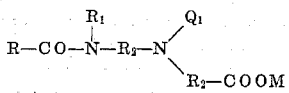

in which R is a hydrocarbon radical of 4–18 carbon atoms; $Q_1$ is selected from the class consisting of (e) hydrogen, (f) $R_6$, and (h) $R_2$—COOM; $R_2$ is selected from the class consisting of (j) aliphatic hydrocarbon and hydroxy substituted hydrocarbon groups of 1–4 carbon atoms, and $R_6$ is an alkyl radical of 1–4 carbon atoms, and $R_1$ is selected from the group consisting of hydrogen and alkyl and hydroxy substituted alkyl radicals of 1–4 carbon atoms and M is an alkali metal.

It is understood, of course, that the terminal OH groups in any of the aforesaid compounds may be ONa because they are obvious equivalents, and one may mean the other wherever it occurs herein.

Said compounds of Formula I may be produced in a number of different ways:

For example, 1 mole of a diamine, such as ethylene diamine ($NH_2C_2H_4NH_2$) may be reacted with 1 mole of a monocarboxylic acid, R—COOH, examples of which are set forth in my U.S. Patent 2,528,378. The reaction may be continued under the conditions set forth in Example 9 of said patent until only 1 mole of water has been formed to provide a compound

R—CO—NH—$C_2H_4$—$NH_2$ 1 mole of said last identified compound may be reacted with 2 moles of one of said monohalomonocarboxylic acids of 1–4 carbon atoms in their radicals attached to the COOH groups thereof, together with about 4.5–5 moles of an alkali metal hydroxide to provide the following compound IB-1:

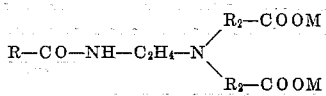

Examples of some of the other diamines which may be employed to produce starting materials which may be used in the practice of this invention are propylene diamine ($NH_2C_3H_6NH_2$), butylene diamine

($NH_2C_4H_8NH_2$)

amino hydroxy propyl diamine ($NH_2C_3H_5OHNH_2$), amino ethyl ethyl amine ($NH_2C_2H_4NHC_2H_5$), hereinafter respectively known as Reactants H, I, J, and L.

The Reactants H, I, J and L respectively may be produced by employing a number of different classical methods well known to the art. One method consists essentially of reacting ammonia with a compound which is a dichloride of $R_2$ to be between two nitrogens and has the formula Cl—$R_2$—Cl and subsequently treating with caustic soda to remove HCl formed to provide the diamine:

$NH_2R_2NH_2$

The following are specific illustrative examples of some of the starting materials of Formula I and the method for preparing them, all parts being given by weight unless otherwise specified:

EXAMPLE A 1 mole of lauric fatty acid ($C_{11}H_{23}COOH$) and 1 mole of ethylenediamine ($NH_2C_2H_4NH_2$) are added together and then heated in the presence of an inert solvent such as toluol in amounts sufficient to dissolve the same. This solution is maintained at a temperature of approximately 110° C. This heating is carried out under a condenser through which pass vapors which consist of some of the solvent and water of reaction as well as small amounts of unreacted amine. These products are caught in a collector from which the water of reaction is removed and the condensed toluol and collected amine are returned to the reacting vessel. The temperature of the mass is maintained at 110° C. under the aforesaid conditions until 0.9 mole of water is collected. Then the toluol and 0.1 additional mole of water are removed under heat and high vacuum. The resultant mass is essentially:

$C_{11}H_{23}CONHC_2H_4NH_2$

Then 1 mole of this compound is mixed with 1 and 2 moles respectively of monochloracetic acid and externally heated and the temperature thereof maintained at 170° C. until a one part sample thereof in 100 parts of an aqueous solution of NaOH having a pH of about 9 provides a clear solution. Then there is added thereto an aqueous solution of 2 and 4 moles of NaOH and the mass is heated to approximately 80–90° C. whereupon the following compounds are produced and are hereinafter known as Product IB-1 and IB-2 of the following respective formulas:

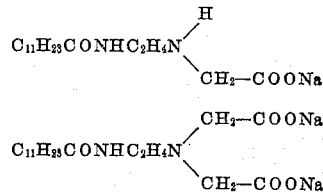

and

EXAMPLE B

Employing the same procedure as that set forth in Example A, except that for the 1 mole of the ethylene diamine there are substituted 1 mole of each of the Reactants H–J, there are provided compounds which are the same as Products IB-1, and IB-2, and except that the $C_2H_4$ groups thereof are replaced by $C_3H_6$, $C_4H_8$,

$C_3H_5OH$ groups respectively, to provide Products IB-3 to IB-8.

EXAMPLE C

Employ the same procedure as that set forth in Example A, but employing 1 mole of Reactant L instead of the ethylene diamine and using only a single mole of the monochloracetic acid, there are provided the following compounds hereinafter known as Products IB-9:

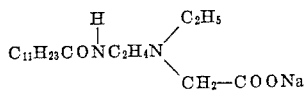

Prior to this invention, it was known that cation surface active agents and anionic surface active agents when together in aqueous solution resulted in the production or formation of water insoluble compounds, and that adding an anionic surface active agent to an aqueous solution of another anionic surface active agent resulted in a mere physical combination of said agents and that no reaction would occur between them.

Said compounds of Formula I, normally behave anionically in aqueous solutions having a pH above 7, and consequently it was expected that when in aqueous solution together with anionic surface agents that they would be combined physically only and that no chemical reaction would occur therebetween. In the course of my experimentations, I have discovered that they could be reacted with certain anionic surface active agents at a pH above 7 to produce water-soluble reaction products. Not only did I make said discovery, but I further discovered that water solutions of such reaction products had viscosities greater than corresponding aqueous solutions of compounds of Formula I, and also exhibited better foaming characteristics than did said compounds in very low dilutions under extreme water hardness conditions. Said reaction products are non-toxic and non-irritating to the human skin. They have been found eminently useful as general utility detergents, such as for car washing, dish washing, clothes washing, etc. Said compounds of Formula I and compounds of Formulas IIA–IID when, any one of them alone or a combination of two or more of them in mere physical mixture are used as components of shampoos caused varying degrees of irritation and marked stinging of the eyes when such shampoos were used and water solutions thereof accidentally reached the eyes. I have further discovered that the reaction products of this invention caused practically no irritation or stinging of the eyes when so employed.

According to this invention, one or a combination of two or more of compounds of the general structural Formula I are reacted with one or a combination of two or more anionic surface active agents of the following general structural Formulas IIA–IID which are broadly referred to as Formula II, to provide novel, water-soluble compounds having the following general structural formula, which are broadly referred to as Formula III, all having high wetting, detergency and surface active properties and capable of providing voluminous and stable foams in aqueous solutions, and which solutions are substantially non-irritating to the skin and eyes of normal human beings.

Compounds of Formulas IIA–IID respectively are detergent sulfonic acid salts and sulfate salts which may be represented as follows:

G—M wherein M has heretofore been defined and G is selected from the group consisting of:

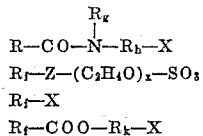

Compounds of Formula III may be represented as follows:

*Formula III*

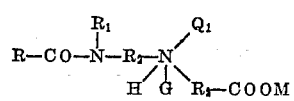

According to this invention, I react a compound of Formula I with a compound of Formula II to provide the novel and highly useful compounds of Formula III. In general, this reaction is carried out in a solution containing compounds I and II and to which a quantity of an acidic agent such as a strong mineral acid, as for example hydrochloric, sulphuric or its equivalent, has been added to lower the pH of the solution to a value of approximately 7 to approximately 9 and while maintaining the mass at a temperature between approximately 100–200° F. In this reaction under the aforesaid conditions, the compounds of Formula III are produced, said compounds having high water solubility. Such compounds of Formula III have an unexpected extremely high water-solubility, while the corresponding salts of cationic compounds are water-insoluble. The resultant aqueous solution can be used directly as a surface active agent, wetting agent or detergent for the purposes indicated for the compounds of Formula I. While the quantities of the compound of Formula I and compound of Formula II may be equimolecular for good yield of compounds of Formula III, I may employ an excess of either, and in general the mole ratio of a compound of Formula I to compound of Formula II may be 2 moles of the former to 1–3 moles of the latter.

One of the specific methods which I prefer to employ in carrying out an aspect of this invention is to first dissolve a compound of Formula I in water and then the pH thereof is adjusted to approximately 12–13 (measured electrically) by the addition of aqueous caustic soda if required so that when a compound of Formula II is added thereto, the pH of the solution of I and II will be at least 10 and generally 10.5–11. The temperature of said solution is raised to 100–200° F. and preferably in factory practice to approximately 140° F. Then a quantity of a compound of Formula II is dissolved in water in a separate container and this solution is added to said first solution and the mass is maintained in said temperature range while being constantly stirred, and an acidic agent is added thereto to reduce the pH thereof to a value below 10 and in the range of approximately 7 to 9, and preferably of approximately 8.2 to approximately 8.7. At the end of the acidic agent addition, the stirring is continued and the temperature of the mass maintained for about 10–20 minutes after which the solution is allowed to cool and is a finished product.

The following are specific examples merely given by way of illustrating the invention and are not to be taken by way of limitation, all parts being given by weight unless otherwise specified.

EXAMPLE 1

An aqueous solution of 420 parts of Product IB–4, in 620 parts of water is heated to approximately 140° F. and its pH adjusted to 12–13 (measured electrically) by the addition of caustic soda. While being constantly stirred and maintained at that temperature there is added a solution of 230 parts of:

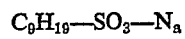

in 350 parts of water. Then while stirring and temperature is maintained, there is added thereto sufficient hydrochloric acid solution (32%) whereby the pH of the mass is lowered to a value in the range of 8.2 to 8.7. Stirring is continued and the temperature is maintained for about 10 minutes more. The resultant product is a solution of the novel reaction product of the following formula:

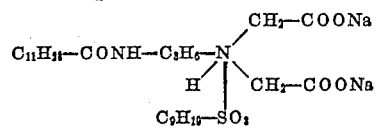

EXAMPLE 2

Employ the same procedure and components as set forth in Example 1, except that only 115 parts of the salt of the sulfonic acid are employed. In this instance, the resultant product is a solution of the novel reaction product of Example 1 together with unreacted Product IB-4 used in the approximate proportion of 2 to 1.

Employ the same procedure as that set forth in Example 1, but employ the components set forth in the following Examples 3–5 on, the quantity of hydrochloric acid solution (32%) is variable to lower the pH to the values indicated to obtain the novel reaction products of Examples 3–5 on.

EXAMPLES 3–4

320 parts of Product IB-1 and 480 parts of IB-2 respectively in 600 parts of water. 400 parts respectively of lauryl taurate sodium salt:

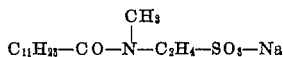

and of lauryl sulfanilamide sodium salt:

Formulas of respective novel reaction products:

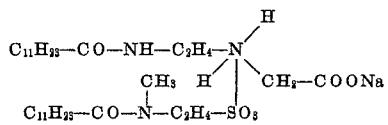

and

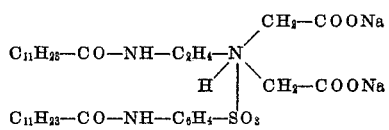

EXAMPLES 5 ON

Employing 1 mole proportion of all of the other specific compounds of Formula I respectively in about one and one-half times its weight of water and 1 mole proportion of any of the specific Formulas IIA–IID respectively in one and one-half times its weight of water, there are produced literally hundreds of compounds of Formula III which differ from those of Examples 1-4 and such compounds are also specific examples of illustrative novel reaction products of this invention. Other examples of Formulas IIa–IID are:

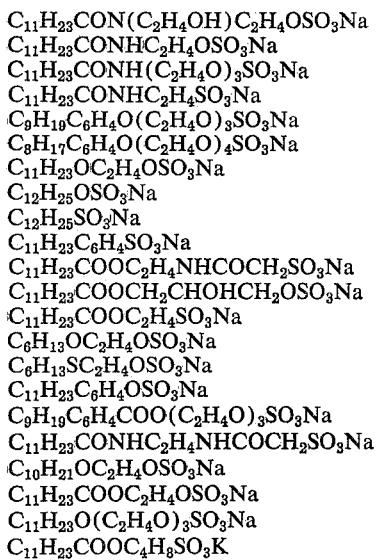

It is also to be understood that any of the specific products of the IB series which are shown herein merely as illustrative examples of the starting materials of Formula I which may be reacted with any of the specific sulfate or sulfonate salts which are shown herein merely as illustrative examples of reactants of Formula II to produce novel compounds of Formula III.

It is to be understood that, as to compounds of Formulas IIA, IIC and IID and also to novel reaction products thereof when either $SO_3$ or $OSO_3$ is used in the specifications or claims, it is meant to indicate either one or the other because of their obvious equivalency; it is also to be understood that the use of Na in the specification and claims is meant to indicate any of the other alkali metals because of their obvious equivalency; and it is also to be understood that the CONH linkage when part of compounds in the specification and claims is meant to indicate either it or NHCO because of their obvious equivalency.

It is also to be understood that instead of first adjusting the pH of the compound of Formula I to 12–13 before the addition of the compound of Formula II, any other method may be employed to obtain the condition whereby the pH of the solution of I and II is at least 10 and preferably 10.5–11 before the addition of the acidic agent to lower the pH of the mass to approximately 7 to approximately 9. For example, I and II may be dissolved together and this solution may by the addition of caustic soda when required have its pH adjusted to at least 10, and then at 100°–200° F. is ready for the addition of the acidic agent to lower its pH to approximately 7 to approximately 9. If desired, the required amount of acidic agent may be added either before or after the solution at pH of at least 10 is brought to a temperature in the range of 100–200° F.

This application is a continuation-in-part of my copending application 585,940 of April 21, 1956 (Patent 2,781,350) which in turn is a continuation in part of now abandoned application 413,721 of March 2, 1954; copending application 592,749 of June 21, 1956 (Patent 2,781,358) which in turn is a continuation in part of now abandoned application 425,307 of April 23, 1954; of copending application 473,043 of December 3, 1954 (2,781,357) and copending application 623,526 of November 21, 1956 (2,781,351) in turn a continuation in part of 565,538 of February 15, 1956 and now abandoned, in turn a continuation in part of now abondoned application 481,703 of January 13, 1955.

This application is a division of my application Serial No. 575,300 of April 2, 1956.

Since certain changes in carrying out the aforesaid processes and certain modifications in the compositions which embody the invention may be made without departing from its scope, it is intended that all matter contained in the description shall be interpreted as illustrative and not in a limiting sense.

It is also to be understood that the following claims are intended to cover all the generic and specific features of the invention herein described, and all statements of the scope of the invention which as a matter of language might be said to fall therebetween.

I claim:

1. A compound selected from the class consisting of salts of detergent sulfonic acids and detergent sulfates respectively and an amphoteric surface active agent, said compound having the following formula:

in which R is a hydrocarbon radical of 4–18 carbon atoms; each $R_2$ is selected from the class consisting of (a) alkylene groups of 1–4 carbon atoms and (b) hydroxy substituted alkylene groups of 1–4 carbon atoms; $Q_1$ is selected from the class consisting of (c) hydrogen, (d) monovalent alkyl radicals of 1–4 carbon atoms and $R_2$—COOM; $R_1$ is selected from the class consisting of (e) hydrogen, (f) monovalent alkyl radicals of 1–4 carbon atoms and (g) monovalent hydroxy substituted alkyl radicals of 1–4 carbon atoms; G is selected from the class consisting of sulfonic acid and sulfate radicals of detergent sulfonic acid salts and sulfate salts; and M is an alkali metal.

2. A compound defined in claim 1, in which $Q_1$ is hydrogen and $R_2$ is hydrocarbon of 1–4 carbon atoms.

3. A compound defined in claim 1 in which $Q_1$ is $CH_2COOM$ and $R_2COOM$ is $CH_2COOM$.

References Cited in the file of this patent

UNITED STATES PATENTS

| | | |
|---|---|---|
| 2,103,872 | Schoeller et al. | Dec. 28, 1937 |
| 2,500,107 | Weichselbaum | Mar. 7, 1950 |
| 2,717,842 | Vitalis | Sept. 13, 1955 |
| 2,773,068 | Mannheimer | Dec. 4, 1956 |
| 2,781,357 | Mannheimer | Feb. 12, 1957 |
| 2,781,382 | Mannheimer | Feb. 12, 1957 |
| 2,781,383 | Mannheimer | Feb. 12, 1957 |
| 2,781,384 | Mannheimer | Feb. 12, 1957 |